United States Patent
Thomas et al.

(10) Patent No.: US 10,044,177 B2
(45) Date of Patent: Aug. 7, 2018

(54) PUSH TO CONNECT WEATHERPROOF BOX

(71) Applicant: Hubbell Incorporated, Shelton, CT (US)

(72) Inventors: Jason Peter Thomas, Mesa, AZ (US); Agus Suryana The, Mesa, AZ (US); Jeffrey Ryan Hlade, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 49 days.

(21) Appl. No.: 14/645,132

(22) Filed: Mar. 11, 2015

(65) Prior Publication Data

US 2015/0263498 A1    Sep. 17, 2015

Related U.S. Application Data

(60) Provisional application No. 61/952,578, filed on Mar. 13, 2014.

(51) Int. Cl.
   *H02G 3/08* (2006.01)
(52) U.S. Cl.
   CPC .................................. *H02G 3/088* (2013.01)
(58) Field of Classification Search
   None
   See application file for complete search history.

(56) References Cited

U.S. PATENT DOCUMENTS

| | | | |
|---|---|---|---|
| 1,822,056 A | 9/1931 | Noble | |
| 4,181,329 A * | 1/1980 | Helm | F16L 37/091 285/3 |
| 4,265,265 A | 5/1981 | Boteler | |
| 4,265,365 A | 5/1981 | Wallace | |
| 6,499,771 B1 * | 12/2002 | Snyder, Sr. | F16L 37/0915 285/319 |
| 6,992,252 B1 * | 1/2006 | Rao | H02G 3/083 174/135 |
| 8,158,884 B2 * | 4/2012 | de la Borbolla | H02G 3/085 174/50 |
| 8,398,122 B2 * | 3/2013 | Crompton | F16L 37/091 285/315 |
| 8,474,877 B2 | 7/2013 | Smith | |
| 8,480,134 B2 | 7/2013 | Crompton et al. | |
| 9,086,179 B1 * | 7/2015 | Komolrochanaporn | F16L 37/091 |
| 2005/0194785 A1 | 9/2005 | Shemtov | |

(Continued)

FOREIGN PATENT DOCUMENTS

| | | |
|---|---|---|
| CN | 87105702 A | 8/1988 |
| CN | 1555469 A | 12/2004 |
| WO | WO 2005114031 A3 * | 5/2006 .......... F16L 37/0915 |

OTHER PUBLICATIONS

Mighty-Seal Brochure, Bridgeport Fittings, 2013, 4 pages.

(Continued)

*Primary Examiner* — Dimary Lopez Cruz
(74) *Attorney, Agent, or Firm* — Wissing Miller LLP

(57) ABSTRACT

An electrical box includes an integral conduit receiving port, a weatherproof fitting displaced in the integral conduit receiving port, a conduit retention device displaced in the integral conduit receiving port and a cap device for retaining the weatherproof fitting and the conduit retention device in the integral conduit receiving port.

23 Claims, 12 Drawing Sheets

(56) References Cited

U.S. PATENT DOCUMENTS

2011/0309611 A1  12/2011  Smith
2012/0284994 A1  11/2012  Crompton et al.

OTHER PUBLICATIONS

Product Sales Webpage, "Orbit 1 inch PVC-Lock Coupling", http://www.homedepot.com/p/Orbit1inPVCLockCoupling38676/203266795, May 19, 2015.
International Search Report and Written opinion mailed in PCT/US20151019995 dated Jun. 22, 2015.
Office Action mailed by the SIPO in CN201580026946.8 dated Sep. 27, 2017, 10 pages.

* cited by examiner

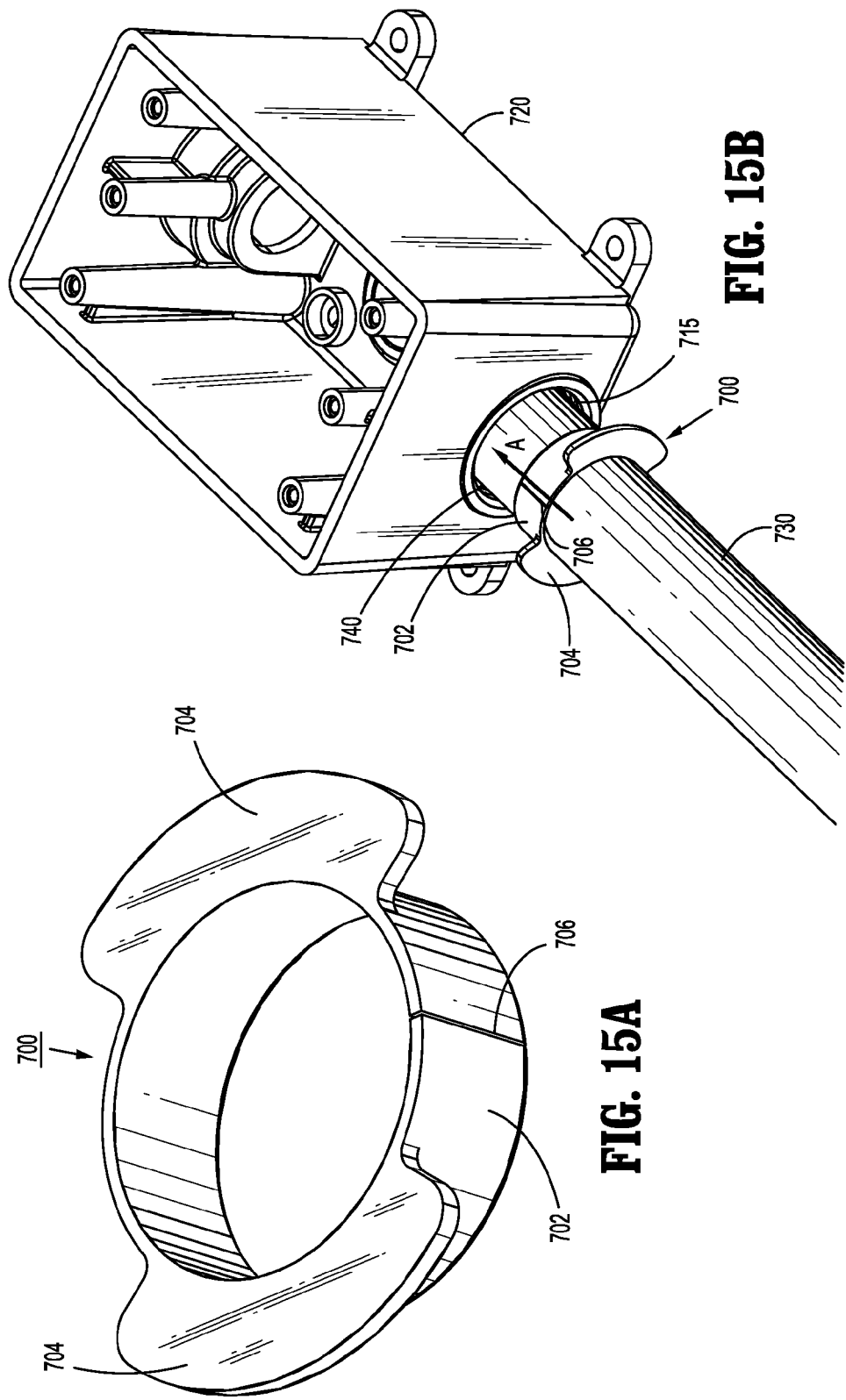

PUSH TO CONNECT WEATHERPROOF BOX

CROSS-REFERENCE TO RELATED APPLICATIONS

This application claims priority to U.S. Provisional Application No. 61/952,578, filed on Mar. 13, 2014, entitled "PUSH TO CONNECT WEATHERPROOF BOX", which is incorporated herein in its entirety by reference.

BACKGROUND

Field

The present disclosure relates generally to weatherproof boxes, and more particularly to push to connect weatherproof boxes.

Description of the Related Art

Buildings including commercial and residential buildings often use common electrical components such as electrical outlets and ground fault circuit interrupter (GFCI) outlets for connecting to a 120v, 240v or similar wiring in a building. These components are often enclosed in standard sized electrical boxes mounted in walls, floors and ceilings that meet certain government or industry standards codes. In certain applications such as outdoor applications, it is also desirable to use weatherproof boxes and may further be desirable to provide such weatherproof electrical boxes for use with electrical wire conduit such as EMT or Rigid conduit.

Weatherproof conduit fittings are generally separate devices that are mounted in a standard casting knockout hole in an electrical box. For example, a standard electrical box may have a simple knockout or plug in an opening that may be removed. A traditional conduit fitting would be a separate device that has a mechanism such as a threaded nut and washer for securing the conduit fitting into whichever box a worker decides to install it in. Such conduit fittings tend to be relatively tall as they protrude from the electrical box and tend to have angled surfaces such as external nut corners that may snag on wires, etc. Additionally, such standard electrical boxes may not be sufficiently structurally stable around knockout holes to accommodate the installation and any other forces that may be transferred from the tall, protruding shape of the separate conduit fitting. Accordingly, there can be issues with form, fit and function as the two devices may not have been specifically designed and built to work with each other. Additionally, there may be structural integrity problems with regard to using traditional conduit fittings in a traditional electrical box opening. Such traditional fittings may also accommodate only one diameter of conduit. Moreover, there may be issues relating to installation and use problems of traditional conduit fittings due to the relatively large height and non-smooth surface of the traditional conduit fittings. Furthermore, installing a separate conduit fitting in an electrical box such as by using a nut and washer incurs relatively high labor costs and requires additional logistics for additional parts. For example, FIG. 16 shows a traditional separate conduit fitting system 1 including a traditional electrical box 2 with ordinary cutout 3, a separate conduit fitting 4 and a conduit 8, thereby illustrating some of the disadvantages associated with traditional systems.

Accordingly, there is a need, among other needs, for an easy to use weatherproof electrical box that provides one or more of greater structural integrity, less likelihood of snag, a lower profile, a more aesthetic appearance, accommodation for multiple diameter conduits and that requires less than traditional installation time.

BRIEF SUMMARY

The present disclosure relates to an electrical box including an integral conduit receiving port, a weatherproof fitting displaced in the integral conduit receiving port, a conduit retention device displaced in the integral conduit receiving port and a cap device for retaining the weatherproof fitting and the conduit retention device in the integral conduit receiving port.

A plastic electrical box includes an integral conduit receiving port formed in-situ in the plastic electrical box, a weatherproof fitting displaced in the integral conduit receiving port, a conduit retention device displaced in the integral conduit receiving port, a seat ring displaced in the integral conduit receiving port for maintaining the weatherproof fitting in proper position in the integral conduit receiving port and a cap device for retaining the weatherproof fitting, the conduit retention device and the seat ring in the integral conduit receiving port.

BRIEF DESCRIPTION OF THE DRAWINGS

The accompanying drawings illustrate presently preferred embodiments of the present disclosure, and together with the general description given above and the detailed description given below, serve to explain principles of the disclosure. As shown throughout the drawings, like reference numerals designate like or corresponding parts.

FIG. 15A is a perspective view of a conduit removal tool according to an embodiment of the present disclosure.

FIG. 15B is a perspective view of a conduit removal tool positioned on a piece of conduit received in a weatherproof electrical box for describing use of the removal tool.

DETAILED DESCRIPTION

Figure 1:
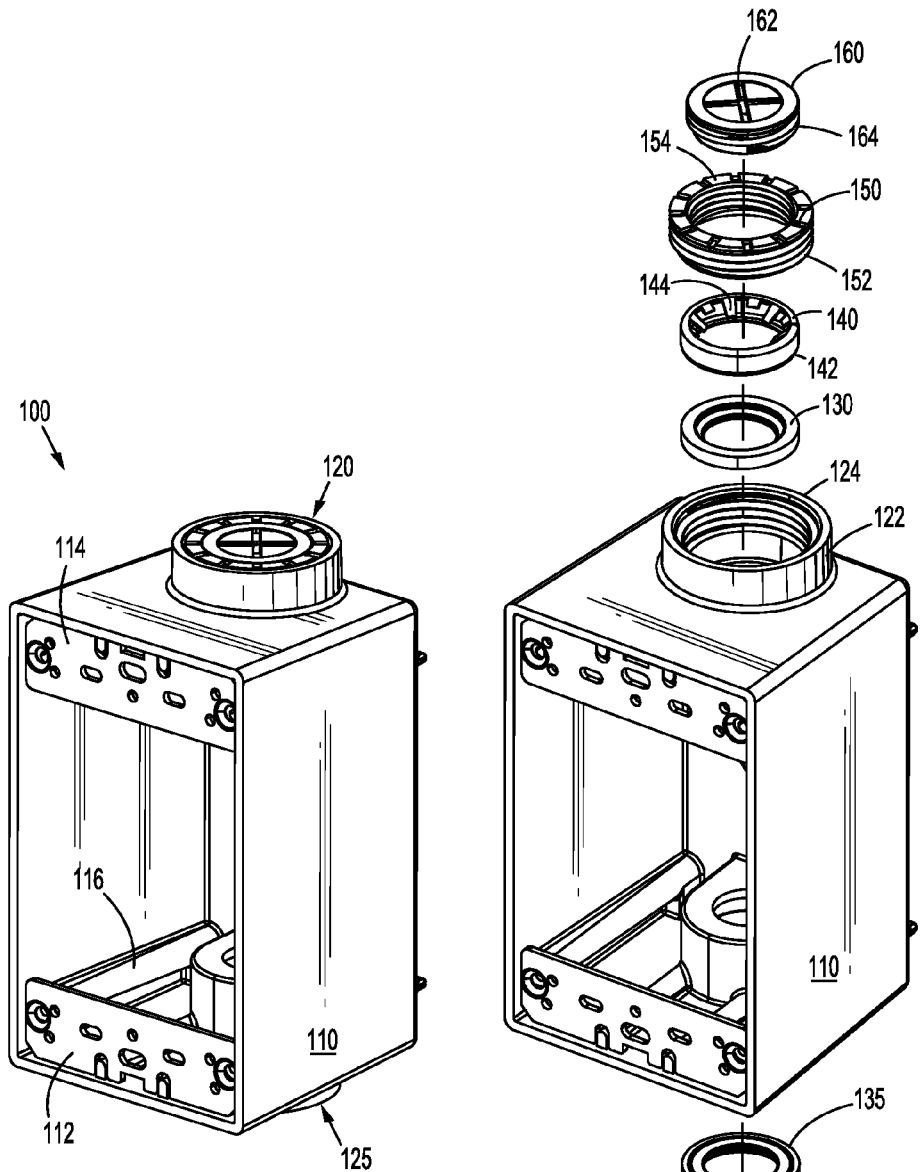
FIG. 1 is a perspective view of a representative assembled weatherproof electrical box having integral conduit receiving ports according to an illustrative embodiment of the present disclosure.

The present disclosure describes several illustrative embodiments of systems and methods for providing easy to use, structurally sound, aesthetically pleasing, relatively low profile weatherproof fittings that accept multiple push-fit electrical wire conduit sizes into integrated weatherproof electrical boxes that accept electrical devices such as switches, outlets, circuit interrupters, light fixtures and other electrical devices, while reducing the labor involved compared to traditional systems.

In one illustrative embodiment, systems and methods for providing relatively easy to install weatherproof electrical boxes configured with an integral port to receive press fit electrical wire conduit of multiple diameters are shown. In an illustrative embodiment, a conduit retention device includes a metal retainer jaw ring that is enclosed in a multi-diameter conduit receiving port, wherein the port is integral to the electrical box. In some configurations, the metal retainer ring is secured in the conduit receiving port by a removable threaded nut, thereby permitting removal of the conduit and the retaining ring. In yet other configurations, the metal retainer ring is permanently secured in the conduit receiving port wherein the port opening is sufficiently wide for a retainer ring tooth disengaging tool to be inserted into the port while a conduit is installed, thereby providing for removal of the conduit.

In certain configurations, one or more of the illustrative embodiments of the present disclosure describe a weatherproof box with hubs or so called conduit ports or protrusions or fitting portions that have a push-to-connect style fitting built directly into the box hubs. For an installation process using such devices, the user will simply push or stab in the electrical conduit such as EMT or Rigid conduit into the hub and a metal retainer ring will bite into the conduit, locking it into the hub. In certain configurations, an O-ring or other gasket is incorporated in the hub to ensure that a weatherproof seal is made. In alternative embodiments, multiple options are provided that make available different weatherproof box configurations, each having a different hub quantity and/or hub location around the box, wherein the hub concept or construction can be selected from the examples described herein. In certain embodiments, a portion of the topmost piece of the hub or another internal component of the fitting may be threaded to accept a standard closure plug when the hub is not in use. This new method will eliminate the need for a traditional separate conduit fitting and will drastically reduce the labor required to assemble the conduit to the box.

In certain illustrative embodiments, the weatherproof box housing is constructed of cast aluminum. In yet other embodiments, one of many different plastics (PVC, PC) that are traditionally used may be selected or any other traditionally used material for weatherproof electrical boxes. Weatherproof fittings such as O-rings or other gaskets are constructed of EPDM, another rubber, or any other suitable material for providing an appropriate seal. The alternative mechanisms described herein may share certain features and/or capabilities, but the manufacturing assembly process may vary.

In certain illustrative embodiments, a permanently fixed fitting will be used having an integrated conduit retention device such as a spring steel ring with teeth. For such embodiments, a separate tool will also be available that slips around the conduit after it has been installed and that slips into a gap between the conduit and hub feature. When the tool is pressed into the hub, the teeth on the retainer ring will be opened, allowing for easy removal of the conduit. In yet another embodiment, the integral fitting is removable from the hub structure that is integrated into the weatherproof box housing, thereby permitting removal of the conduit and even replacement of internal fitting components such as a weatherproof fitting including an O-ring or other gasket.

Referring to FIG. 1, a perspective view of a representative assembled weatherproof electrical box 100 having integral conduit receiving ports 120, 125 according to an illustrative embodiment of the present disclosure is shown. Here, the weatherproof box system includes a housing 110 that is constructed of cast aluminum of an appropriate alloy and/or coatings. Faceplate supports 112, 114 are secured to the housing using structures 116 and are constructed of aluminum or other suitable material such as plastic or steel.

Figure 2:
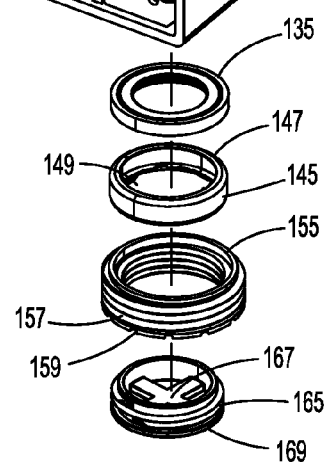
FIG. 2 is an exploded perspective view showing the partially disassembled weatherproof electrical box having integral conduit receiving ports of FIG. 1.

Referring to FIG. 2, an exploded perspective view showing the partially disassembled weatherproof electrical box 100 having integral conduit receiving ports 120, 125 of FIG. 1 is shown. Here, one of the conduit ports is shown at a top location of the weatherproof box 100 with a tubular shape protrusion that is a conduit fitting housing 122 cast integrally into the weatherproof box housing 110. Alternatively, a conduit fitting housing may be secured to the housing such as by welding or otherwise securing it to the housing. As shown in this illustrative example, the integral conduit fitting housing 122 includes a smooth external surface or somewhat tubular shape and the internal surface includes threads 124 for receiving components of the conduit fitting such as a retaining nut 150. Here, the exploded view shows a weatherproof fitting or gasket 130 removed from the internal cavity of the conduit fitting. A conduit retention device or spring steel jaw ring 140 is also shown removed from its particular space in the internal cavity of the conduit fitting housing. The jaw ring 140 includes a bottom seat ring 142 that engages and secures the top surface of the gasket 130. Additionally, the jaw ring 140 includes two or more teeth 144 of varying lengths that are used for engaging and securing varying diameter of conduit when it is installed. Here, the jaw ring 140 includes several teeth 144 that can be described as some short and some long. A cap device 150 is shown as a cap nut that is externally threaded 152. In this example, the cap nut 150 is removably installed into the conduit fitting housing 122 using threads 124. Such configuration allows net indents 154 to be engaged by a tool for removal of conduit and fitting components after installation. The cap nut 150 is also internally threaded for receiving a closure plug 160, wherein the closure plug includes threads 164 and tool engaging grooves 162 such as for engaging a screwdriver tool.

In this illustrative example, the weatherproof box 100 also includes a second conduit fitting 125 that includes the same components as in fitting 120. Here, gasket 135 is provided and a jaw ring 145 includes a gasket securing ring 147 and one or more teeth 149. Cap nut 155 includes external threads 157 and tool indents 159 providing for installation and removal. The cap nut 155 is also internally threaded for receiving a closure plug 165, wherein the closure plug includes threads 169 and tool engaging grooves 167 such as for engaging a screwdriver tool.

Figure 3:
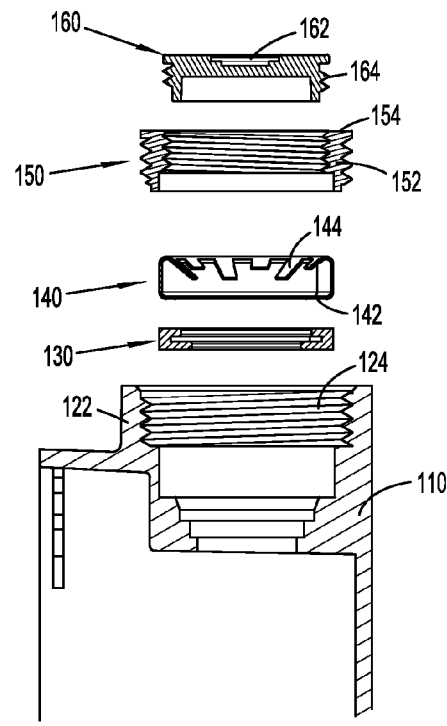
FIG. 3 is a partial exploded cutaway view showing the partially disassembled weatherproof electrical box having integral conduit receiving ports of FIG. 1.

Referring to FIG. 3, a partial exploded cutaway view showing the partially disassembled weatherproof electrical box 100 having integral conduit receiving ports 120, 125 of FIG. 1 is shown. Here, one of the conduit ports 120 is shown in cutaway cast integrally into the weatherproof box housing 110. As shown in this illustrative example, the integral conduit fitting housing 122 includes a smooth external surface or somewhat tubular shape and the internal surface is threaded for receiving components of the conduit fitting such as a retaining nut 150. Here, the exploded view shows a weatherproof fitting or gasket 130 removed from the internal cavity of the conduit fitting. A conduit retention device or spring steel jaw ring 140 is also shown removed from its particular space in the internal cavity of the conduit fitting housing. The jaw ring 140 includes a bottom seat ring 142 that engages and secures the top surface of the gasket 130. Additionally, the jaw ring 140 includes two or more teeth of varying length 144 for engaging and securing varying diameters of conduit when it is installed. Here, the jaw ring 140 includes several teeth 144 that can be described as some short and some long. A cap device 150 is shown as a cap nut that is externally threaded 152. In this example, the cap nut 150 is removably installed into the conduit fitting housing 122 using threads 124. Such configuration allows net indents 154 to be engaged by a tool for removal of conduit and fitting components after installation. The cap nut 150 is also internally threaded for receiving a closure plug 160, wherein the closure plug includes threads 164 and tool engaging grooves 162 such as for engaging a screwdriver tool.

Figure 4:
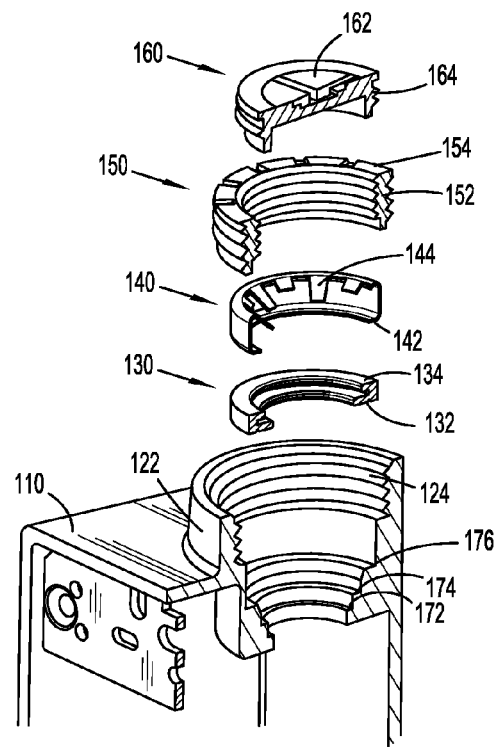
FIG. 4 is a partial exploded perspective cutaway view showing the partially disassembled weatherproof electrical box having integral conduit receiving ports of FIG. 1.

Referring to FIG. 4, a partial exploded perspective cutaway view showing the partially disassembled weatherproof electrical box 100 having integral conduit receiving ports 120, 125 of FIG. 1 is shown. Most of the reference numerals of FIG. 4 have been described above including with reference to FIG. 3. Here, the perspective view provides a cutaway view of the internal cavity of conduit fitting housing 122 such that internal shoulders can be described. In this example, internal shoulder 172 is used for engaging a relatively narrow outer diameter conduit. Similarly, internal shoulder 174 is used for engaging a relatively wider outer diameter conduit. Accordingly, in this illustrative example, the conduit fitting 120 may accommodate conduits having at least two different outer diameters. Alternatively, additional shoulders can be cast or formed in the internal cavity of the conduit fitting housing 122 to accommodate more than two conduit diameters. Finally, shoulder 176 engages and secures the internal components of the conduit fitting including the weatherproof fitting 120 that supports the components above it.

Figure 5:
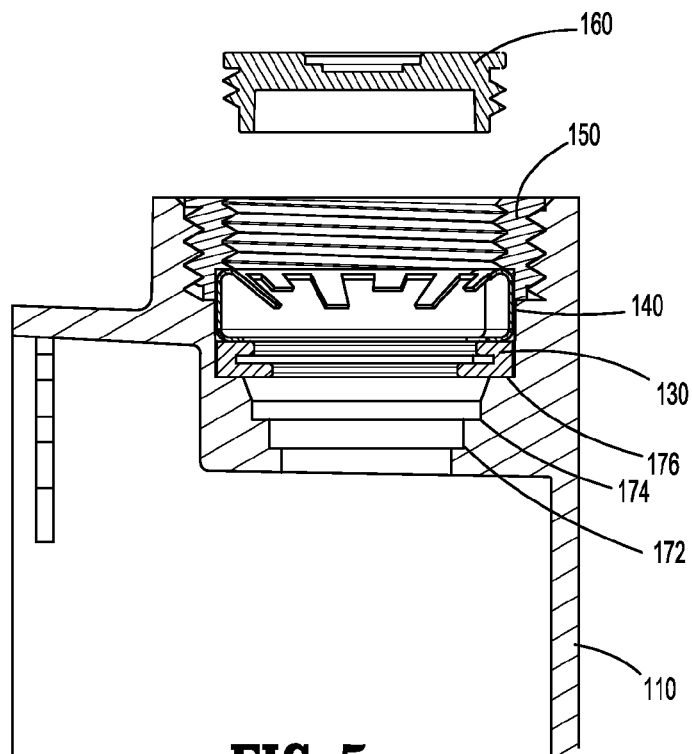
FIG. 5 is a partial exploded cutaway view showing the assembled weatherproof electrical box having integral conduit receiving ports of FIG. 1.

Referring to FIG. 5, a partial exploded cutaway view showing the assembled weatherproof electrical box 100 having integral conduit receiving ports 120, 125 of FIG. 1 is shown. The reference numerals of FIG. 5 have been described above including with reference to FIGS. 3 and 4. As shown the outer edges of gasket 130 engage and rest on shoulder 176 and bottom seat ring 142 of jaw ring 140 engages and secures the top surface of gasket 130. These elements are held in place and secured by cap nut 150.

Figure 6:
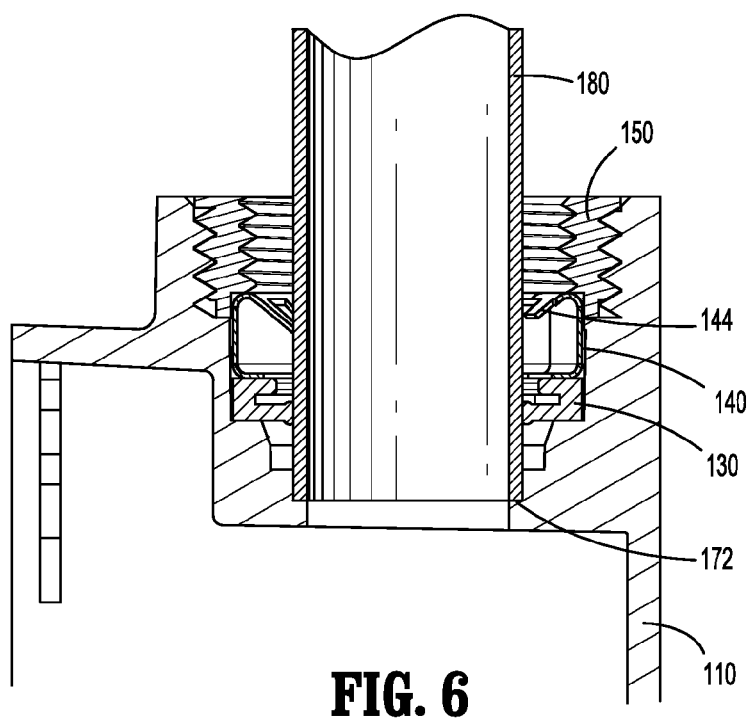
FIG. 6 is a partial exploded cutaway view showing the weatherproof electrical box having integral conduit receiving ports of FIG. 1 with an EMT conduit installed.

Referring to FIG. 6, a partial exploded cutaway view showing the weatherproof electrical box 100 having integral conduit receiving ports 120, 125 of FIG. 1 with an EMT conduit 180 installed is shown. The reference numerals of FIG. 6 have been described above including with reference to FIGS. 3, 4 and 5. Here, the internal conduit fitting components are shown installed abutting shoulder 176 and secured by cap nut 150. The EMT conduit 180 is shown installed abutting shoulder 172 that accommodates a first outer diameter conduit that is relatively narrow. Additionally, the bottom ring of gasket 130 is shown slightly deformed and engaging conduit 180 to form a weatherproof seal. In this case, the first relatively narrow diameter conduit engages the longer of the jaw ring 140 teeth 144.

Figure 7:
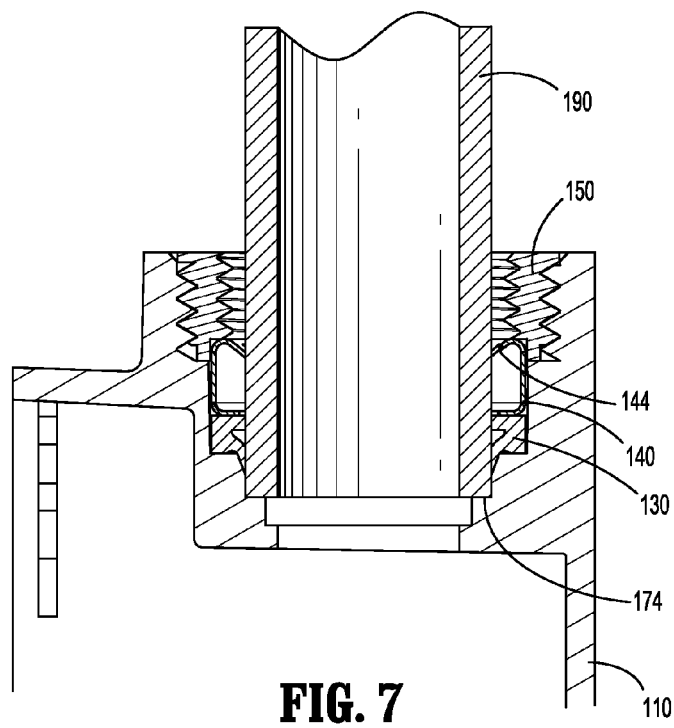
FIG. 7 is a partial exploded cutaway view showing the weatherproof electrical box having integral conduit receiving ports of FIG. 1 with a rigid conduit installed.

Referring FIG. 7, a partial exploded cutaway view showing the weatherproof electrical box 100 having integral conduit receiving ports 120, 125 of FIG. 1 with a rigid conduit 190 installed is shown. The reference numerals of FIG. 7 have been described above including with reference to FIGS. 3, 4 and 5. Here, the internal conduit fitting components are shown installed abutting shoulder 176 and secured by cap nut 150. The Rigid conduit 190 is shown installed abutting shoulder 174 that accommodates a second outer diameter conduit that is relatively wide compared to the EMT conduit diameter and thus relatively wide. Additionally, the bottom ring of gasket 130 is shown more significantly deformed than in FIG. 6 and engaging conduit 190 to form a weatherproof seal. In this case, the second relatively wider diameter conduit engages the longer of the jaw ring 140 teeth 144 at a more severe angle and then engages the shorter of the jaw ring 140 teeth 144 at a less severe angle that may apply more holding force.

Figure 8:
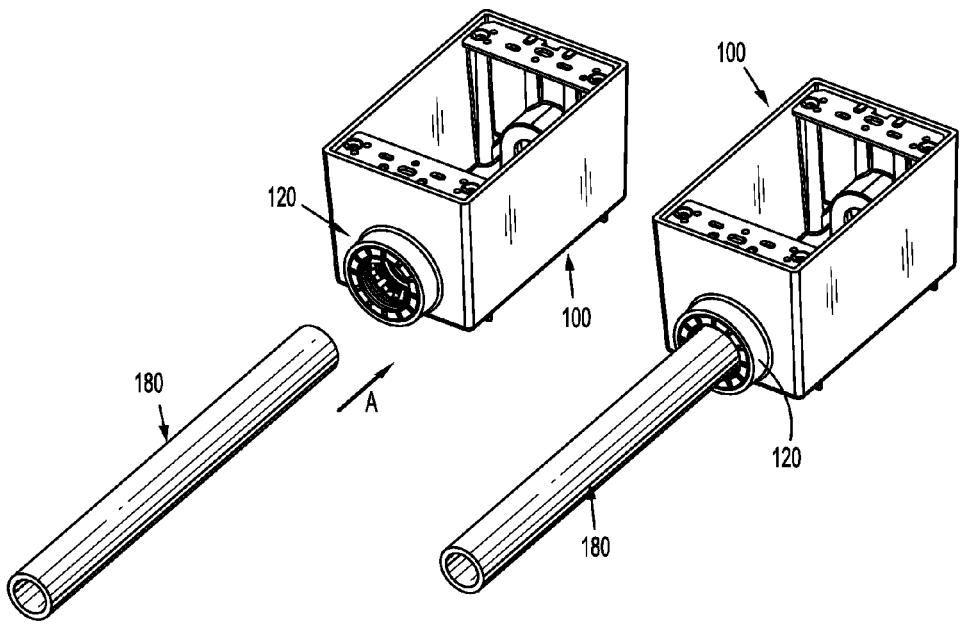
FIG. 8 is a schematic view showing a process for installing electrical conduit into the weatherproof electrical box having integral conduit receiving ports of FIG. 1.

Referring to FIG. 8, a schematic view showing a process for installing electrical conduit 180 into the weatherproof electrical box 100 having integral conduit receiving ports 120, 125 of FIG. 1 is shown. Here, the user takes conduit 180 and presses or stabs it into integral conduit fitting 120 in direction A.

Figure 9:
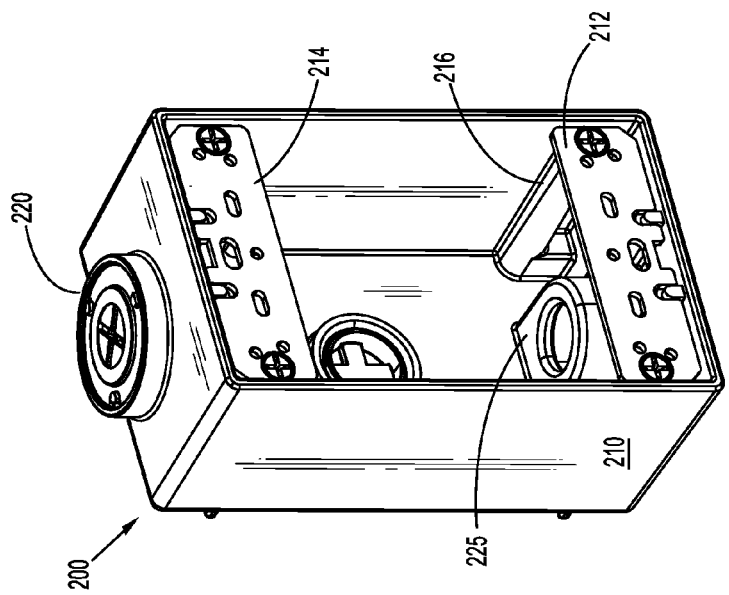
FIG. 9 is a perspective view of another representative assembled weatherproof electrical box having integral conduit receiving ports according to another illustrative embodiment of the present disclosure.

Referring to FIG. 9, a perspective view of another representative assembled weatherproof electrical box 200 having integral conduit receiving ports 220, 225 according to another illustrative embodiment of the present disclosure is shown. Here, the weatherproof box system 200 includes a housing 210 that is constructed of cast aluminum of an appropriate alloy and/or coatings. Faceplate supports 212, 214 are secured to the housing using structures 216 and are constructed of aluminum or other suitable material such as plastic or steel. Also, the integral conduit fitting 220 is even more flush to the electrical box housing 210 than in the device of FIG. 1. The electrical box housing 210 is still configured to provide the required amount of internal volume to meet applicable code standards.

Figure 10:
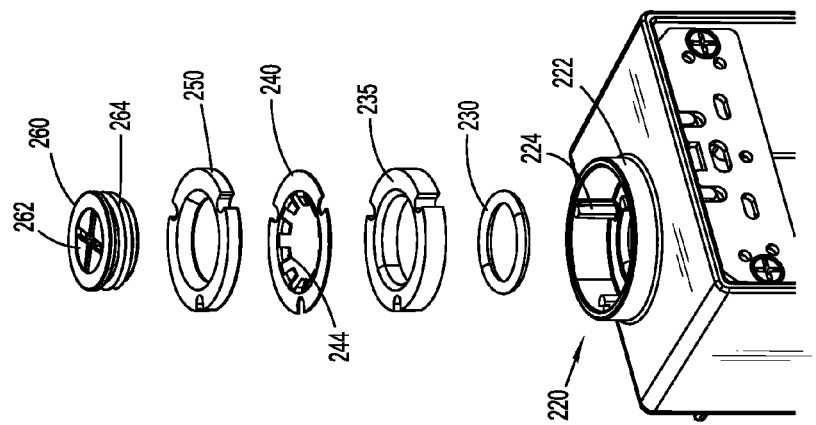
FIG. 10 is a partial exploded perspective view showing the partially disassembled weatherproof electrical box having integral conduit receiving ports of FIG. 9.

Referring to FIG. 10, a partial exploded perspective view showing the partially disassembled weatherproof electrical box having integral conduit receiving ports of FIG. 9 is shown. Here, one of the conduit ports is 220 shown in exploded view. As shown in this illustrative example, the integral conduit fitting housing 222 includes a smooth external surface or somewhat tubular shape and the internal surface includes one or more posts 224 to swedge down to engage and permanently secure the internal components of the integral conduit fitting. Here, the exploded view shows a weatherproof fitting or gasket 230 removed from the internal cavity of the conduit fitting. A gasket retention device 235 is made of Plastic (PC or PVC), Aluminum or other suitable material. As shown the internal components that are wide enough to engage posts 224 have cutouts to accommodate the posts 224. A conduit retention device or spring steel jaw ring 240 is also shown removed from its particular space in the internal cavity of the conduit fitting housing. The jaw ring 240 includes one or more teeth 244 for engaging and securing conduit when it is installed. Here, the jaw ring 240 includes several teeth 244. A cap retaining device 250 is shown as a top retainer ring that is grooved to engage the posts 224. In this example, the cap retaining device 250 is permanently installed into the conduit fitting housing 222 using posts 224 that are swedged to permanently secure the internal components. Such configuration requires that the teeth 244 be compressed using a tool such as that shown in FIGS. 15A, 15B (described later below) in order to remove a conduit after installation. The cap retaining device 250 is also internally threaded for receiving a closure plug 260, wherein the closure plug includes threads 264 and tool engaging grooves 262 such as for engaging a screwdriver tool.

Figure 11:
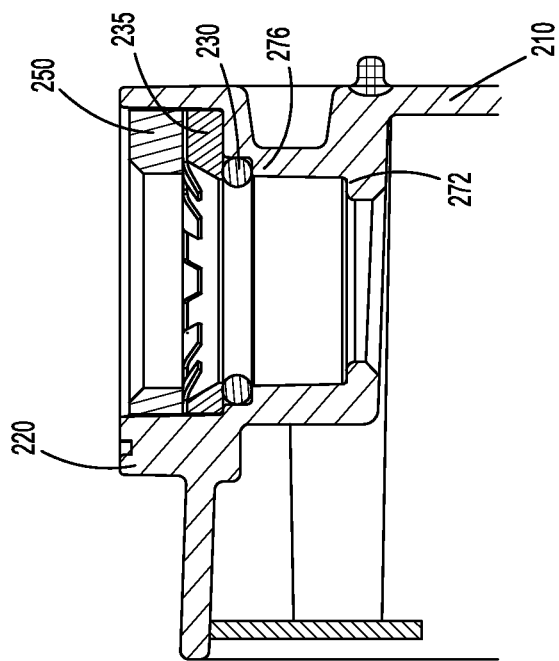
FIG. 11 is a partial cutaway view showing the assembled weatherproof electrical box having integral conduit receiving ports of FIG. 9.

Referring to FIG. 11, a partial cutaway view showing the assembled weatherproof electrical box 200 having integral conduit receiving ports 220, 225 of FIG. 9 is shown. The reference numerals of FIG. 12 have been described above including with reference to FIG. 10. Here, the internal conduit fitting components are shown installed abutting shoulder 276 and secured by cap retention ring 250. Here, internal cavity shoulder 272 is shown without a conduit installed.

Figure 12:
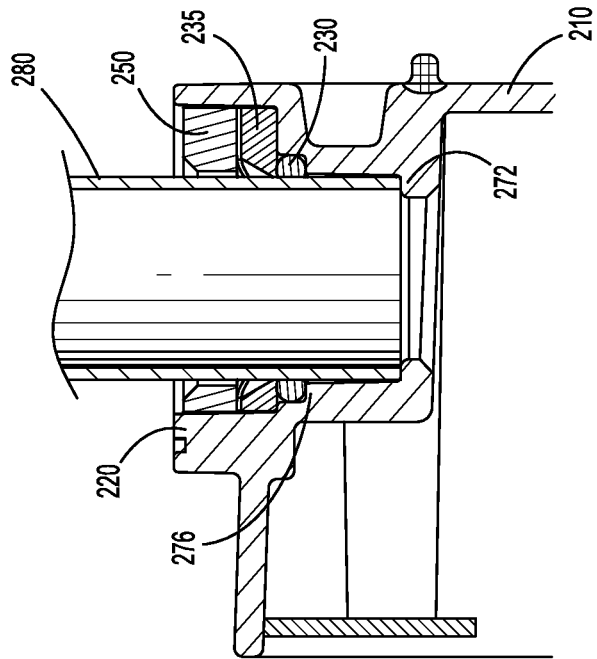
FIG. 12 is a partial cutaway view showing the weatherproof electrical box having integral conduit receiving ports of FIG. 9 with an EMT conduit installed.

Referring to FIG. 12, a partial cutaway view showing the weatherproof electrical box 200 having integral conduit receiving ports 220, 225 of FIG. 9 with an EMT conduit 280 installed. The reference numerals of FIG. 12 have been described above including with reference to FIGS. 10 and 11. Here, the internal conduit fitting components are shown installed abutting shoulder 276 and secured by cap retention ring 250. Here, internal cavity shoulder 272 is shown with a conduit 280 installed and abutting the shoulder 272.

According to another embodiment of the present disclosure, aluminum parts may be replaced with molded plastic (PC or PVC) parts. For example, referring to FIG. 13A, an exploded perspective view showing the partially disassembled molded plastic weatherproof electrical box 300 having integral conduit receiving port 313 is shown. Here, one conduit receiving port is shown in the weatherproof box 300. Of course, two or more conduit receiving ports may be provided in the weatherproof box 300 as desired. Conduit receiving port 313 includes a tubular shape recess that is a conduit fitting housing 315 formed integrally within the weatherproof box housing 320. That is, conduit fitting housing 315 may be formed in-situ with the weatherproof box housing 320. Alternatively, the conduit fitting housing 315 may be secured to the housing 320 such as by plastic welding, gluing or otherwise securing it to the housing. As shown in this illustrative embodiment, the integral conduit fitting housing 315 is substantially flush with the outside surface of weatherproof housing 320. Here, the exploded view shows a weatherproof fitting or O-ring 318 removed from the internal cavity of the conduit fitting housing 315. A seat ring 316 is also shown removed from the internal cavity of the conduit fitting housing 315 and includes a bottom surface that engages and secures the top surface of the O-ring 318. A conduit retention device or jaw ring 314 is also shown removed from its particular space in the internal cavity of the conduit fitting housing 315. The outside edge portion 317 of jaw ring 314 engages and rests on a top edge of seat ring 316. Additionally, the jaw ring 314 includes two or more teeth 319 that are used for engaging and securing conduit when it is installed. Here, the jaw ring 314 includes several teeth 319 that are substantially the same size and shape. In the alternative, jaw ring 314 may include several teeth that can be described as some short and some long. Retaining ring 312 includes a lower surface that abuts the outside edge portion 317 of jaw ring 314 and holds jaw ring 314 in position. Retaining ring 312 may be dimensioned to snugly press fit into conduit fitting housing 315 and can be further secured in place using an appropriate glue as desired. A cap 310 includes a raised handle portion 311 sufficient to provide a grip for a user's fingers or a tool such as a pair of pliers. Cap 310 has a diameter dimensioned to fit snugly in place when positioned in fitting housing 315. A plurality of supports 324 are provided within weatherproof box housing 320 each of which may be supported by support structures 326 extending from the sides of the housing 320. Supports 324 may include tapered holes 328 therein for receiving screws for securing an electrical device (e.g., switch, outlet, etc) and/or a faceplate. Tabs 322 may extend from the lower edge of the housing 320 as shown and may include pre-made holes 323 for securing the housing 320 to a structure using, for example, screws, nails, staples, etc. According to an embodiment of the present disclosure, cap 310, retaining ring 312 and seat ring 316 are formed from a plastic (PVC, PC, etc.). Jaw ring 314 is formed generally from spring steel.

Figure 13A:
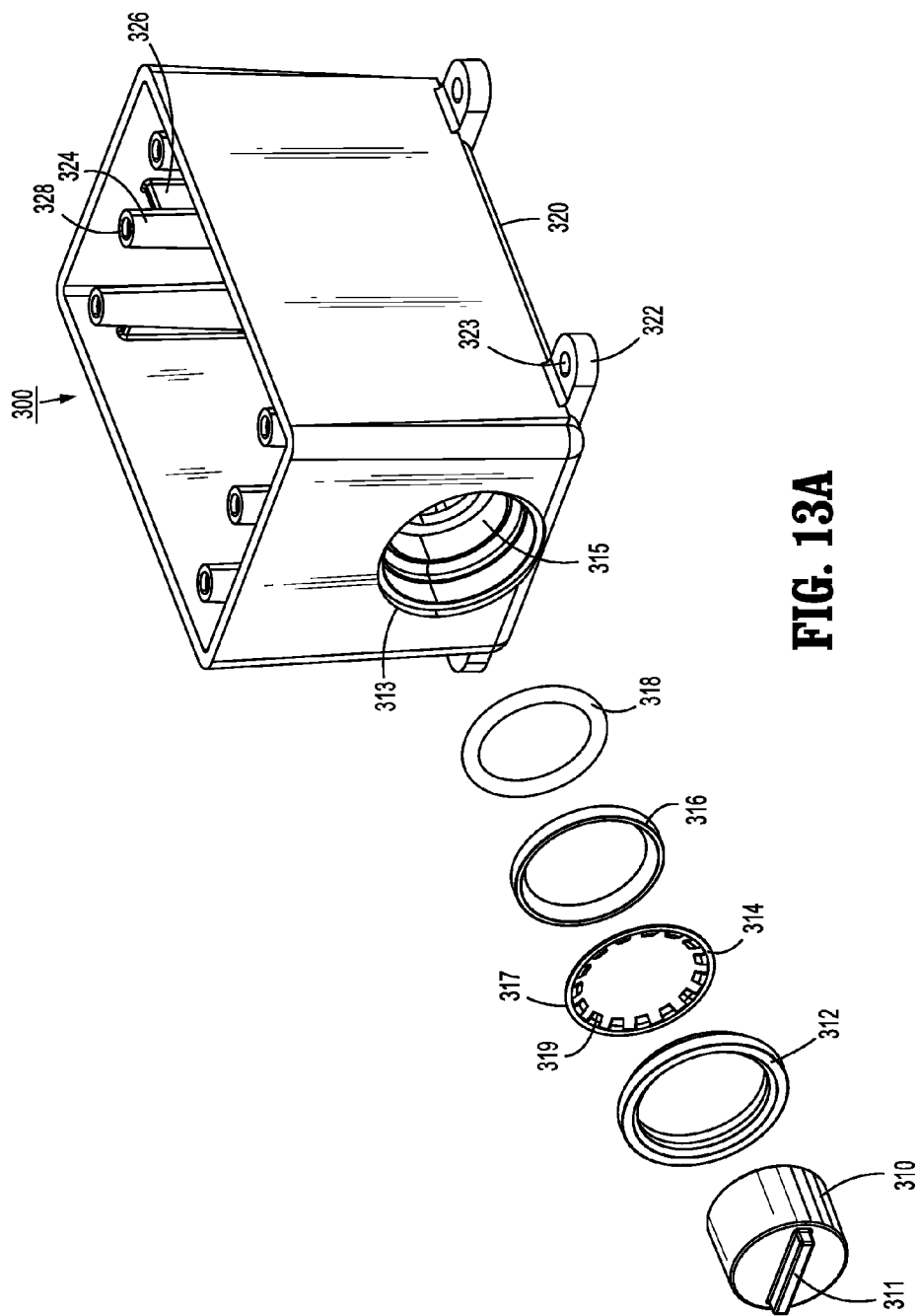
FIG. 13A is an exploded perspective view showing a partially disassembled weatherproof electrical box having integral conduit receiving port according to another embodiment of the present disclosure.
Figure 13B:
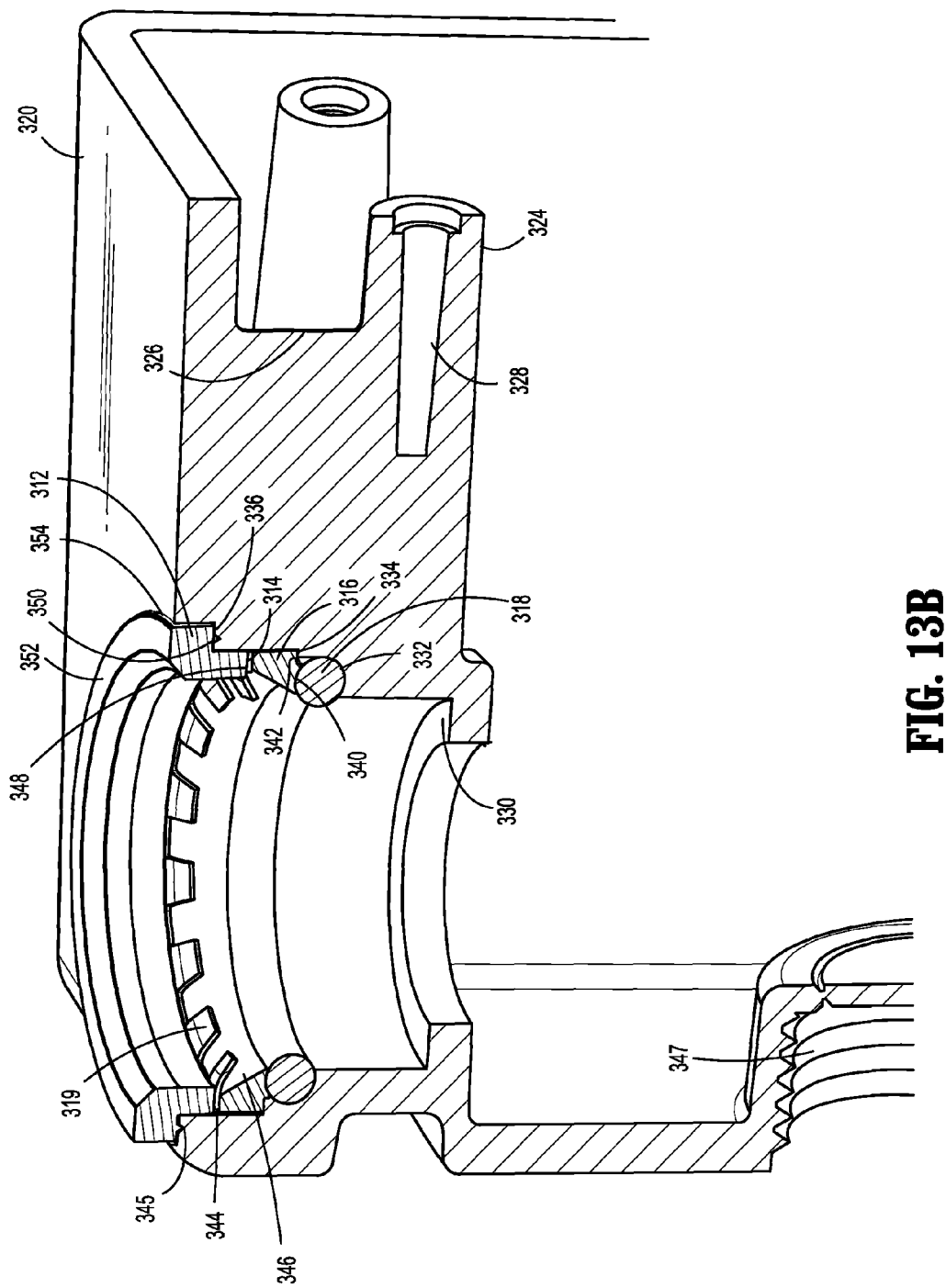
FIG. 13B is a partial cutaway view showing the weatherproof electrical box having integral conduit receiving port of FIG. 13A.

Referring to FIG. 13B, a partial cutaway view showing the assembled weatherproof electrical box 300 having integral conduit receiving port 313 of FIG. 13A is shown. Most of the reference numerals of FIG. 13B have been described above including with reference to FIG. 13A. Here, the perspective view provides a cutaway view of the internal cavity of conduit fitting housing 315 of waterproof housing 320 such that internal shoulders can be described. According to this embodiment of the present disclosure, conduit fitting housing 315 is molded and formed in-situ with the rest of waterproof housing 320. Conduit fitting housing 315 includes a shoulder 332 with a concave surface having a radius similar to that of a cross-section of O-ring 318 for engaging O-ring 318 as shown. Seat ring 316 includes a lower surface 340 also having a concave surface having a radius similar to that of a cross-section of O-ring 318 for engaging and securing O-ring 318. Seat ring 316 also includes an outer edge 342 that engages and rests on shoulder 334 of conduit fitting housing 315. Jaw ring 314 is dimensioned so that its outer ring portion rests on an upper edge 344 of seat ring 316. Seat ring includes an angled inner surface 346 as shown for allowing teeth 319 to flex downward when a conduit is received into the housing. Retaining ring 312 includes a lower surface 348 that rests upon an upper portion of jaw ring 314 as well as a ledge 350 that rests on shoulder 336 of conduit fitting housing 315. The upper portion 352 of retaining ring 312 has a diameter dimensioned to fit orifice 354 of the conduit fitting housing 315. For example, retaining ring 312 may be dimensioned so that it can be press fit snugly into place in orifice 354. In addition, or alternatively, ring 312 can be glued in place in orifice 354 using a suitable PVC glue. Alternatively, the inner upper surface of conduit fitting housing 315 may be threaded along with the outside surface of retaining ring 312 so that retaining ring 312 may be screwed into position. Once the elements shown in FIG. 13B are in place, a conduit (not shown) can be slid into place so that it is gripped by teeth 319, is sealingly engaged by O-ring 318 and the end of the conduit rests on internal ledge 330 of conduit fitting housing 315.

As also shown in FIG. 13B, waterproof housing 320 may also include one or more threaded orifices 347 on a back surface thereof, for receiving threaded conduit, etc. as desired. Tapered holes 328 in supports 324, as shown, are not threaded. Since support 324, like the rest of the housing 320, is made from a plastic such as PVC, tapered holes 328 will self-tap when an appropriately sized screw is driven into the hole. V-shaped notches 345 may be provided along lower surface 348 for accepting glue when glue is used to secure retaining ring 312 in position.

Figure 14A:
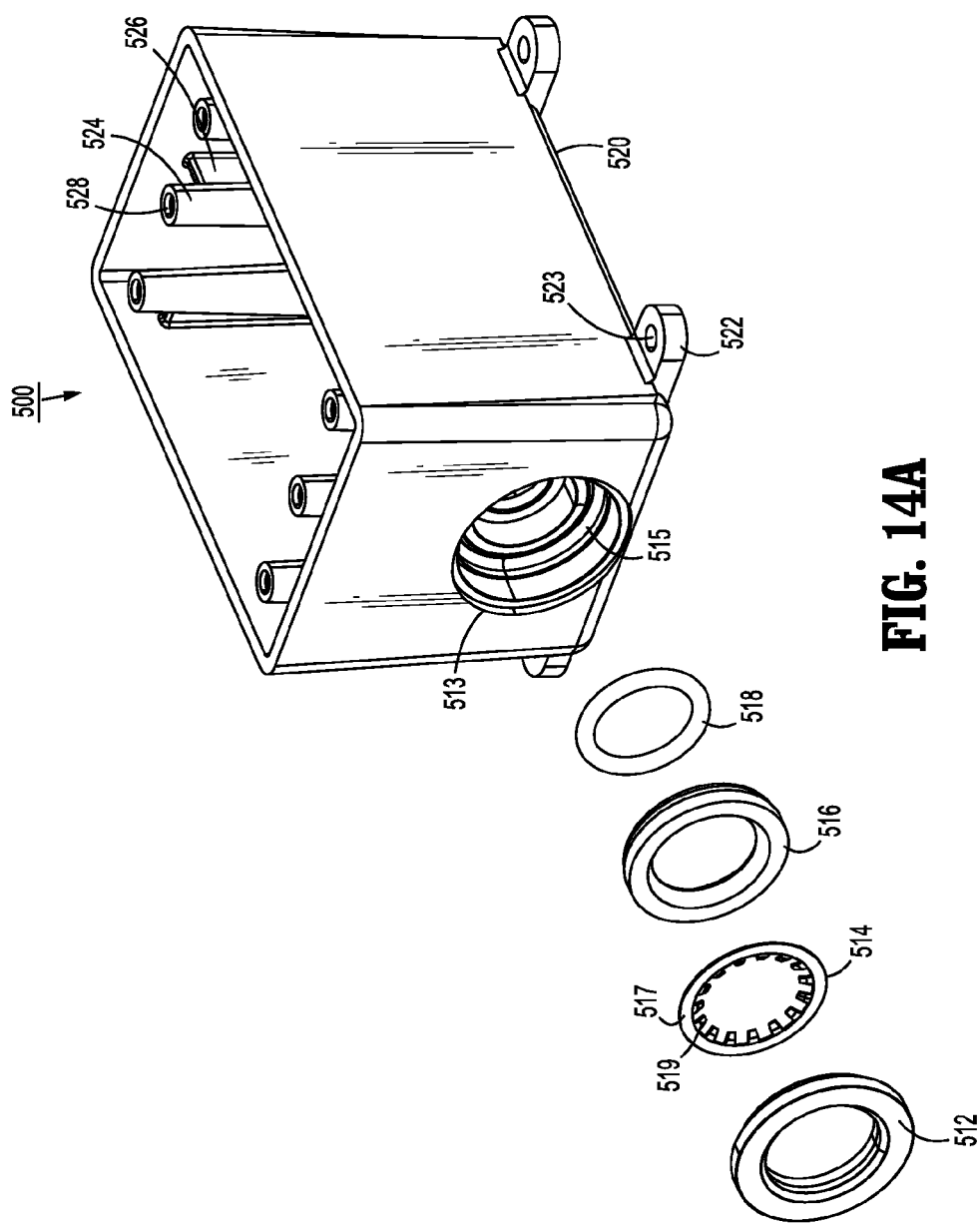
FIG. 14A is an exploded perspective view showing a partially disassembled weatherproof electrical box having integral conduit receiving port according to another embodiment of the present disclosure.
Figure 14B:
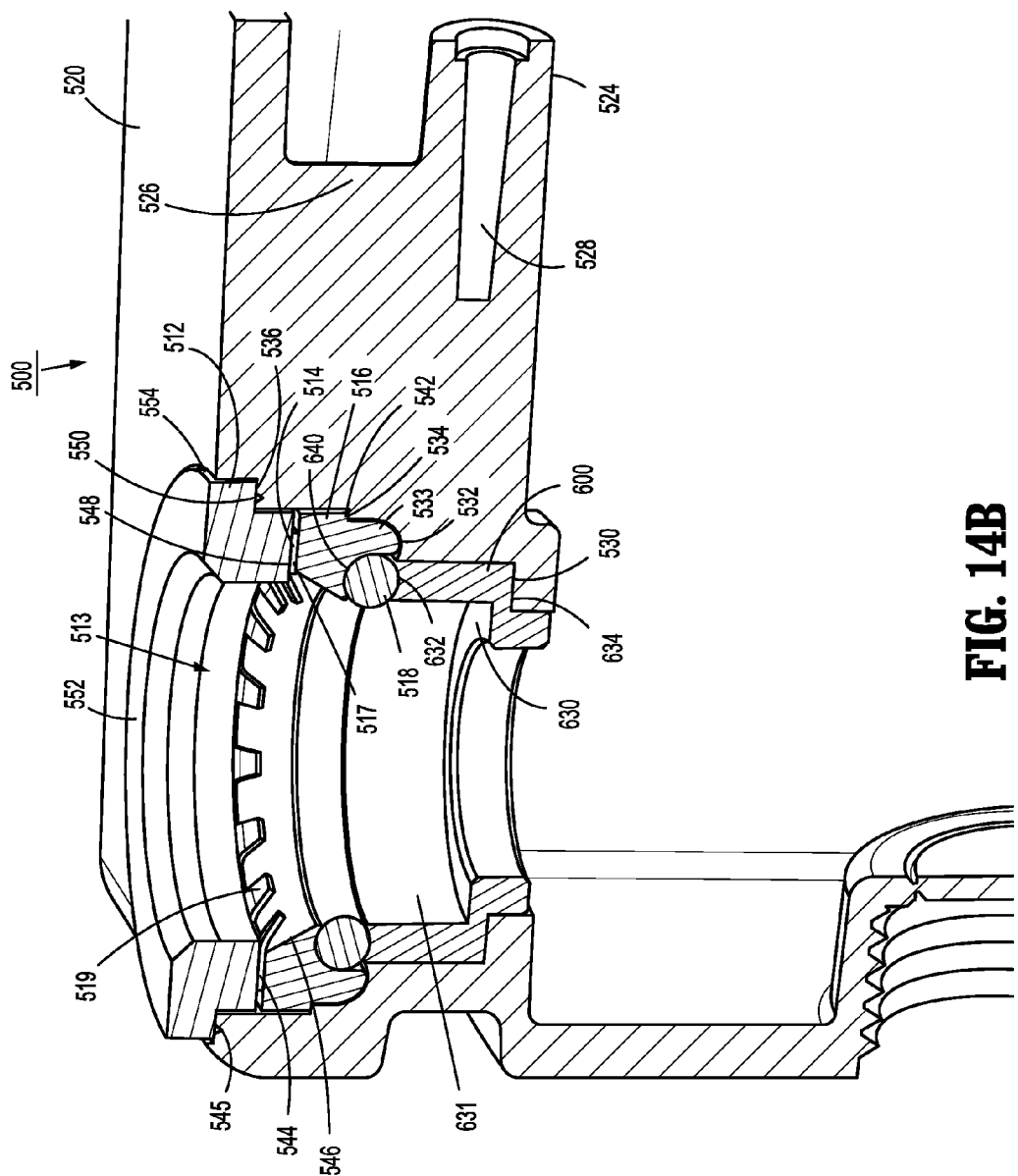
FIG. 14B is a partial cutaway view showing the weatherproof electrical box having integral conduit receiving port of FIG. 14A.
Figure 16:
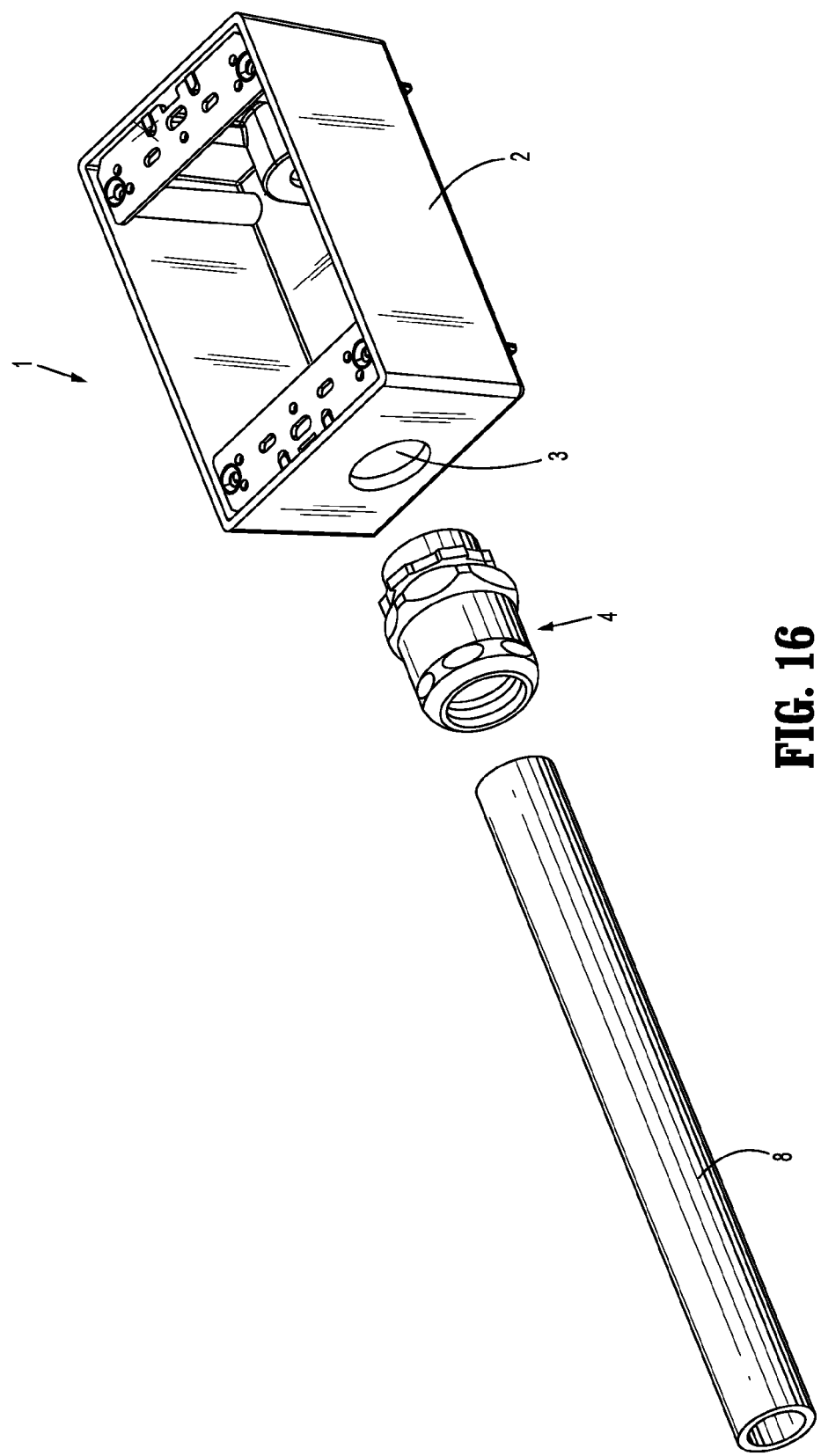
FIG. 16 is a perspective view of a prior art conduit fitting separate from an electrical box.

FIGS. 14A and 14B depict a molded plastic (e.g., PVC, PC) weatherproof electrical box 500 according to another embodiment of the present disclosure. Weatherproof electrical box 500 is capable of receiving a relatively smaller diameter conduit than that which can be received in the weatherproof electrical box 300 described above with respect to FIGS. 13A, 13B. Referring to FIG. 14A, an exploded perspective view showing the partially disassembled molded plastic weatherproof electrical box 500 having integral conduit receiving port 513 is shown. Here, one conduit receiving port is shown in the weatherproof box 500. Of course, two or more conduit receiving ports may be provided in the weatherproof box 500 as desired. Conduit receiving port 513 includes a tubular shape recess that is a conduit fitting housing 515 formed integrally within the weatherproof box housing 520. According to this embodiment of the present disclosure, conduit fitting housing 515 is molded and formed in-situ with the rest of waterproof housing 520. Alternatively, the conduit fitting housing 515 may be secured to the housing 520 such as by plastic welding, gluing or otherwise securing it to the housing. As shown in this illustrative embodiment, the integral conduit fitting housing 515 is substantially flush with the outside surface of weatherproof housing 520. Here, the exploded view shows a weatherproof fitting or O-ring 518 removed from the internal cavity of the conduit fitting housing 515. A seat ring 516 is also shown removed from the internal cavity of the conduit fitting housing 515 and includes a bottom surface that engages and secures the top surface of the O-ring 518. A conduit retention device or jaw ring 514 is also shown removed from its particular space in the internal cavity of the conduit fitting housing 515. The outside edge portion 517 of jaw ring 514 engages and rests on a top edge of seat ring 516. Additionally, the jaw ring 514 includes two or more teeth 519 that are used for engaging and securing conduit when it is installed. Here, the jaw ring 514 includes several teeth 519 that are substantially the same size and shape. In the alternative, jaw ring 514 may include several teeth that can be described as some short and some long. Retaining ring 512 includes a lower surface that abuts the outside edge portion 517 of jaw ring 514 and holds jaw ring 514 in position. Retaining ring 512 may be dimensioned to snugly press fit into conduit fitting housing 515 and can be further secured in place using appropriate glue as desired. Although not shown, a cap such as cap 310 described above with respect to FIG. 13A may be provided. According to this embodiment, the inside diameters of retaining ring 512, jaw ring 514, seat ring 516 and O-ring 518 are dimensioned to receive a conduit substantially smaller in diameter than that which would be used in the embodiment depicted in FIGS. 13A, 13B. A plurality of supports 524 are provided within weatherproof box housing 520 each of which may be supported by support structures 526 extending from the sides of the housing 520. Supports 524 may include tapered holes 528 therein for receiving screws for securing an electrical device (e.g., switch, outlet, etc.) and/or a faceplate. Tabs 522 may extend from the lower edge of the housing 520 as shown and may include pre-made holes 523 for securing the housing 520 to a structure using, for example, screws, nails, staples, etc. According to an embodiment of the present disclosure, retaining ring 512 and seat ring 516 are formed from a plastic (e.g., PVC, PC, etc.). Jaw ring 314 is formed generally from spring steel.

Referring to FIG. 14B, a partial cutaway view showing the assembled weatherproof electrical box 500 having integral conduit receiving port 513 of FIG. 14A is shown. Here, the perspective view provides a cutaway view of the internal cavity of conduit fitting housing 515 of waterproof housing 520 such that internal shoulders can be described. According to this embodiment of the present disclosure, conduit fitting housing 515 is molded and formed in-situ with the rest of waterproof housing 520. Here, a reducing hub 600 is provided. Reducing hub 600 can be formed in-situ with waterproof housing 520 or can be a separate part formed from a plastic such as PVC and dimensioned to fit in conduit fitting housing 515. It will be appreciated from FIG. 14B that if formed as a separate part, reducing hub 600 can be used along with retaining ring 512, jaw ring 514, seat ring 516 and O-ring 518 in a waterproof housing 520 having a conduit fitting housing that is substantially similar to conduit fitting housing 315 described above with respect to FIGS. 13A, 13B. Reducing hub 600 is formed from a plastic such as PVC, PC, etc.

Conduit fitting housing 515 includes a shoulder 530 upon which lower surface 634 of reducing hub 600 rests. An upper portion 632 of reducing hub 600 has a concave surface with a radius similar to that of a cross-section of O-ring 518 for engaging and supporting O-ring 518 as shown. In this embodiment, the concave surface of shoulder 532 is formed in conduit fitting housing 515. It should be noted that the concave surface of shoulder 532 is similar to the concave surface of shoulder 332 described above with respect to FIG. 13B. In this case, seat ring 516 includes a lower surface 533 which is convex and has a radius similar to that of the concave surface of shoulder 532 such that seat ring 516 rests on shoulder 532 as shown. Seat ring 516 also includes a lower concave surface 640 having a radius similar to that of a cross-section of O-ring 518 for engaging and securing O-ring 518 as shown. Seat ring 516 also includes an outer edge 542 that engages and rests on shoulder 534 of conduit fitting housing 515. Jaw ring 514 is dimensioned so that its outer ring portion 517 rests on an upper edge 544 of seat ring 516. Seat ring 516 includes an angled inner surface 546 as shown for allowing teeth 519 to flex downward when a conduit is received into the housing. Retaining ring 512 includes a lower surface 548 that rests upon an upper portion of jaw ring 514 as well as a ledge 550 that rests on shoulder 536 of conduit fitting housing 515. The upper portion 552 of retaining ring 512 has a diameter dimensioned to fit orifice 554 of the conduit fitting housing 515. For example, retaining ring 512 may be dimensioned so that it can be press fit snugly into place in orifice 554. In addition, or alternatively, ring 512 can be glued in place in orifice 554 using a suitable PVC glue. Alternatively, the inner upper surface of conduit fitting housing 515 may be threaded along with the outside surface of retaining ring 512 so that retaining ring 312 may be screwed into position. Once the elements shown in FIG.

14B are in place, a conduit having a smaller outer diameter than that used in the embodiments described above with respect to FIGS. 13A, 13B can be slid into place so that it is gripped by teeth 519, is sealingly engaged by O-ring 518 and the end of the conduit rests on internal ledge 630 of reducing hub 600.

As also shown in FIG. 14B, waterproof housing 500 may also include one or more threaded orifices 547 on a back surface thereof, for receiving threaded conduit, etc. as desired. Tapered holes 528 in supports 524, as shown, are not threaded. Since support 524, like the rest of the housing 520, is made from a plastic such as PVC, tapered holes 528 will self-tap when an appropriately sized screw is driven into the hole. V-shaped notches 545 may be provided along lower surface 548 for accepting glue when glue is used to secure retaining ring 512 in position.

Once conduit is received in any of the conduit fitting housings described above, the teeth of the jaw ring (e.g., jaw rings 140, 240, 314 and 414) will securely lock the conduit in position and effectively prevent the conduit from being removed from the conduit fitting housing. FIG. 15A depicts a removal tool 700 that can be used to easily remove conduit from the conduit fitting housing. Removal tool 700 may be made of any suitable type of material including metal, plastic, aluminum, etc. In the embodiment depicted in FIG. 15A, removal tool 700 is made from a flexible plastic material. Removal tool 700 includes a substantially tubular section 702 having wing sections 704 extending from an upper portion thereof. Tubular section 702 is a continuous piece of plastic except for a slit 706 which extends there through as shown. Removal tool 700 may be formed from any suitably flexible type of material including but not limited to polypropylene, rubber, etc.

FIG. 15B depicts a plastic (e.g., PVC, PC) waterproof housing 720 having a conduit fitting housing 715. A conduit 730 extends into conduit fitting housing 715 and is secured in position by a jaw ring (not shown) such as that described in any of the embodiments described above. Removal tool 700 is flexible and can be spread apart at slit 706 so that it can be placed on conduit 730 as shown. Removal tool 700 can then be slid along conduit 730 in the direction of arrow A into the gap 740 between the conduit 730 and the conduit fitting housing 715 until the tubular section 702 engages the teeth of the jaw ring and separates the teeth from contact with conduit 730. Conduit 730 can then be easily backed out of conduit fitting housing 715. It will be appreciated that removal tool 700 can be made of a rigid material such as steel or aluminum in which case the removal tool would be made in two parts that come together to form a removal tool similar to that described above. The two parts of the removal tool may be hinged together for convenience if desired.

While illustrative embodiments of the present disclosure have been described and illustrated above, it should be understood that these are exemplary and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box comprising:
   an integral conduit receiving port;
   a weatherproof fitting to be positioned against a shoulder in the integral conduit receiving port;
   a conduit retention device having a bottom portion to be positioned against the weatherproof fitting and a top portion having a plurality of first teeth and a plurality of second teeth, wherein the plurality of first teeth extend a first distance toward a center of the conduit receiving port at an angle toward the bottom portion of the conduit retention device, wherein the plurality of second teeth extend a second distance toward a center of the conduit receiving port at an angle toward the bottom portion of the conduit retention device, and wherein the first distance is less than the second distance, such that the plurality of second teeth are capable of engaging conduits having a first outside diameter, and the plurality of first teeth and the plurality of second teeth are capable of engaging conduits having a second outside diameter; and
   a cap device to be positioned against the conduit retention device for retaining the weatherproof fitting and the conduit retention device in the integral conduit receiving port.

2. The electrical box of claim 1, wherein the integral conduit receiving port is formed in-situ in the electrical box.

3. The electrical box of claim 2, further comprising at least two integral conduit receiving ports.

4. The electrical box of claim 1, wherein the conduit retention device is permanently installed in the integral conduit receiving port.

5. The electrical box of claim 1, wherein the conduit retention device is removably installed in the integral conduit receiving port using the cap device.

6. The electrical box of claim 5, wherein the cap device comprises a cap nut threaded to engage a threaded portion of the integral conduit receiving port.

7. The electrical box of claim 1, wherein the integral conduit receiving port comprises:
   a first inner shoulder for engaging a conduit having the first outside diameter; and
   a second inner shoulder having a greater inside diameter than the first inner shoulder for engaging a conduit having the second outside diameter.

8. The electrical box of claim 1, wherein the weatherproof fitting comprises an O-ring.

9. The electrical box of claim 1, wherein the weatherproof fitting comprises a gasket having a relatively flat, open-ended cylindrical shape with a top flange of a first opening with a first inside diameter and a bottom flange having a second opening with a second inside diameter that is smaller than the first inside diameter.

10. The electrical box of claim 1, wherein the conduit retention device comprises a spring steel jaw ring.

11. The electrical box of claim 1, wherein the conduit retention device comprises a spring steel jaw ring having the plurality of first teeth and the plurality of second teeth, wherein each of the plurality of first teeth having a length selected from at least a first length suitable for engaging a first conduit having a first outside diameter, and wherein each of the plurality of second teeth having a second length that is different from the first length and that is suitable for engaging a second conduit having a second outside diameter that is different from the first outside diameter of the first conduit.

12. The electrical box of claim 11, further comprising a tool for removing conduit held in place by the conduit retention device, the tool comprising, a tube having an inner diameter substantially similar to an outer diameter of a conduit to be removed and an outer diameter smaller than an inner diameter of the conduit receiving port, the tube slipping around the conduit after it has been installed and slipping into a gap between the conduit and the conduit receiving port for separating the plurality of teeth of the spring steel jaw from the conduit.

13. The electrical box of claim 1, wherein the electrical box is formed from a material selected from at least one of steel, aluminum and plastic.

14. A plastic electrical box comprising:
   an integral conduit receiving port formed in-situ in the plastic electrical box;
   a weatherproof fitting to be positioned against a shoulder in the integral conduit receiving port;
   a seat ring to be positioned against the weatherproof fitting for maintaining the weatherproof fitting in position in the integral conduit receiving port;
   a conduit retention device to be positioned against the seat ring and having a plurality of first teeth and a plurality of second teeth, wherein the plurality of first teeth extend a first distance toward a center of the conduit receiving port at an angle toward the seat ring, wherein the plurality of second teeth extend a second distance toward a center of the conduit receiving port at an angle toward the seat ring, and wherein the first distance is less than the second distance, such that the plurality of second teeth are capable of engaging conduits having a first outside diameter, and the plurality of first teeth and the plurality of second teeth are capable of engaging conduits having a second outside diameter that is greater than the first diameter; and
   a cap device to be positioned against the conduit retention device for retaining the weatherproof fitting, the conduit retention device and the seat ring in the integral conduit receiving port.

15. The plastic electrical box of claim 14, wherein the conduit retention device is permanently installed in the integral conduit receiving port.

16. The plastic electrical box of claim 14, wherein the conduit retention device is removably installed in the integral conduit receiving port using the cap device.

17. The plastic electrical box of claim 14, wherein the integral conduit receiving port comprises a first shoulder for engaging conduit having the second outside diameter.

18. The plastic electrical box of claim 17, further comprising a reducing hub displaced in the integral conduit receiving port, the reducing hub having a second shoulder having a smaller inside diameter than the first shoulder for engaging a conduit having the first outside diameter.

19. The plastic electrical box of claim 18, wherein the reducing hub is formed in-situ with the plastic electrical box.

20. The plastic electrical box of claim 18, wherein the reducing hub is a separate member removably displaced in the integral conduit receiving port.

21. The plastic electrical box of claim 14, wherein the weatherproof fitting comprises an O-ring.

22. The plastic electrical box of claim 14, wherein the conduit retention device comprises a spring steel jaw ring.

23. The plastic electrical box of claim 14, further comprising a tool for removing conduit held in place by the conduit retention device, the tool comprising, a tube having an inner diameter substantially similar to an outer diameter of a conduit to be removed and an outer diameter smaller than an inner diameter of the conduit receiving port, the tube slipping around the conduit after it has been installed and slipping into a gap between the conduit and the conduit receiving port for separating the plurality of teeth from the conduit.

* * * * *